(12) United States Patent
Kim et al.

(10) Patent No.: US 12,061,514 B2
(45) Date of Patent: Aug. 13, 2024

(54) POWER MANAGEMENT INTEGRATED CIRCUIT AND ELECTRONIC DEVICE INCLUDING THE SAME

(71) Applicant: SAMSUNG ELECTRONICS CO., LTD., Suwon-si (KR)

(72) Inventors: Younghun Kim, Seongnam-si (KR); Kyungrae Kim, Seongnam-si (KR); Min Sang Park, Yongin-si (KR); Junhyun Bae, Hwaseong-si (KR); Junchul Shin, Hwaseong-si (KR); Younghoon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 17/643,526

(22) Filed: Dec. 9, 2021

(65) Prior Publication Data

US 2022/0276694 A1     Sep. 1, 2022

(30) Foreign Application Priority Data

Feb. 26, 2021     (KR) ........................ 10-2021-0026487

(51) Int. Cl.
| | |
|---|---|
| G06F 1/3296 | (2019.01) |
| G01R 19/00 | (2006.01) |
| G01R 22/06 | (2006.01) |
| G01R 23/16 | (2006.01) |
| G06F 1/324 | (2019.01) |
| H02M 3/158 | (2006.01) |

(52) U.S. Cl.
CPC ............ *G06F 1/3296* (2013.01); *G06F 1/324* (2013.01)

(58) Field of Classification Search
CPC ....... G06F 1/3296; G06F 1/324; G06F 1/3203
See application file for complete search history.

(56) References Cited

U.S. PATENT DOCUMENTS

| | | |
|---|---|---|
| 6,212,645 B1 | 4/2001 | Tjandrasuwita |
| 8,897,093 B2 | 11/2014 | Chen et al. |
| 9,484,893 B1 | 11/2016 | Ruotsalainen et al. |
| 9,678,556 B2 | 6/2017 | Pal et al. |
| 9,904,349 B2 | 2/2018 | Dutta et al. |
| 10,075,071 B2 | 9/2018 | Park et al. |
| 10,671,111 B1 | 6/2020 | Spaggiari et al. |

(Continued)

*Primary Examiner* — Jaweed A Abbaszadeh
*Assistant Examiner* — Gayathri Sampath
(74) *Attorney, Agent, or Firm* — F. Chau & Associates, LLC

(57) ABSTRACT

A power management integrated circuit (PMIC) includes voltage regulators, a conversion circuit, a measurement cycle controller, an oscillator, and a control logic. The voltage regulators generate regulator voltages. The conversion circuit converts analog signals indicating load currents of the voltage regulators to generate digital signals corresponding to the load currents. The measurement cycle controller operates in response to a first clock signal having a first frequency and generates an oscillation enable signal that is activated during a measurement period. The oscillator generates a second clock signal having a second frequency higher than the first frequency in response to the oscillation enable signal. The control logic operates in response to the second clock signal and generates power information, indicating power consumed by the load currents during the measurement period, using the digital signals.

18 Claims, 14 Drawing Sheets

(56) References Cited

U.S. PATENT DOCUMENTS

| | | | |
|---|---|---|---|
| 2013/0067258 A1* | 3/2013 | Furuya | G06F 1/3237 |
| | | | 713/322 |
| 2014/0351615 A1* | 11/2014 | Gupta | H03K 19/0016 |
| | | | 713/323 |
| 2015/0370313 A1 | 12/2015 | Tamura | |
| 2016/0111958 A1* | 4/2016 | Choi | G01R 19/0092 |
| | | | 327/540 |
| 2018/0048230 A1* | 2/2018 | Park | H02M 3/1584 |
| 2019/0179363 A1 | 6/2019 | Cho | |
| 2019/0286214 A1 | 9/2019 | Pabalkar | |
| 2020/0136629 A1 | 4/2020 | Kirschner | |

\* cited by examiner

| MODE | MFLG (B1) | PSEN (B2) | TSEN (B3) | BSEN (B4) | tMS |
|------|-----------|-----------|-----------|-----------|-----|
| NOP  | 0 | 0 | 0 | 0 | 0 |
| MD1  | 1 | 1 | 1 | 1 | tPM+tTM+tBM |
| MD2  | 1 | 1 | 1 | 0 | tPM+tTM |
| MD3  | 1 | 1 | 0 | 1 | tPM+tBM |
| MD4  | 1 | 0 | 1 | 1 | tTM+tBM |
| MD5  | 1 | 1 | 0 | 0 | tPM |
| MD6  | 1 | 0 | 1 | 0 | tTM |
| MD7  | 1 | 0 | 0 | 1 | tBM |

POWER MANAGEMENT INTEGRATED CIRCUIT AND ELECTRONIC DEVICE INCLUDING THE SAME

CROSS-REFERENCE TO RELATED APPLICATION

This U.S. non-provisional application claims priority under 35 U.S.C. § 119 to Korean Patent Application No. 10-2021-0026487, filed on Feb. 26, 2021 in the Korean Intellectual Property Office (KIPO), the disclosure of which is incorporated by reference herein in its entirety.

TECHNICAL FIELD

Embodiments of the inventive concept relate generally to semiconductor integrated circuits, and more particularly, to a power management integrated circuit and an electronic device including the power management integrated circuit.

DISCUSSION OF RELATED ART

Various power circuits are used to supply power to semiconductor integrated circuits. Among the various power circuits, a power management integrated circuit (PMIC) may include a voltage regulator configured to perform a DC-DC conversion of converting a direct current (DC) voltage from a power source to provide an operation voltage for a semiconductor integrated circuit. Nowadays, as the use of mobile devices increases, the demand for high efficiency DC-DC converters increases.

It is desirable to use DC-DC converters in which an effect of a resistor component is minimized to reduce power consumption caused by a voltage drop across the resistor. One way to do so is to employ a switching converter, which uses an inductor for easily obtaining a target level of voltage while minimizing power consumption. A switching converter includes a buck converter to transform a high direct current (DC) voltage into a lower DC voltage and a boost converter to boost the DC voltage. A switching converter that uses an inductor has lower power consumption than a DC-DC converter using a resistor, and thus, the switching converter may have higher energy efficiency. Further, a DC-DC converter may include a low drop-out (LDO) regulator composed of a linear regulator. A power management integrated circuit (PMIC) to supply power to load devices may provide power information in real-time so as to reduce power consumption and enhance performance of the load devices.

SUMMARY

According to an embodiment of the inventive concept, a power management integrated circuit (PMIC) includes a plurality of voltage regulators, a conversion circuit, a measurement cycle controller, an oscillator, and a control logic. The plurality of voltage regulators generate a plurality of regulator voltages. The conversion circuit converts analog signals indicating load currents of the plurality of voltage regulators to generate digital signals corresponding to the load currents. The measurement cycle controller operates in response to a first clock signal having a first frequency and generates an oscillation enable signal that is activated during a measurement period. The oscillator generates a second clock signal having a second frequency higher than the first frequency in response to the oscillation enable signal. The control logic operates in response to the second clock signal and generates power information indicating power consumed by the load currents during the measurement period, using the digital signals.

According to an embodiment of the inventive concept, a PMIC includes a plurality of voltage regulators configured to generate a plurality of regulator voltages, a conversion circuit configured to convert analog signals, indicating load currents of the plurality of voltage regulators, a battery voltage, and operation temperatures, to generate digital signals corresponding to the load currents, the battery voltage, and the operation temperatures, a measurement cycle controller configured to operate in response to a first clock signal having a first frequency and generate an oscillation enable signal that is activated during a measurement period, an oscillator configured to be enabled in response to the oscillation enable signal to generate a second clock signal having a second frequency higher than the first frequency, and a control logic configured to operate in response to the second clock signal, and generate power information indicating power consumed by the load currents, battery information indicating the battery voltage, and temperature information indicating the operation temperatures during the measurement period, using the digital signals.

According to an embodiment of the inventive concept, an electronic device includes a PMIC and a load device. The PMIC generates, in response to a first clock signal having a first frequency, a second clock signal having a second frequency higher than the first frequency and activated during a measurement period. The PMIC provides real-time measurement information in response to the second clock signal. The load device performs a dynamic voltage and frequency scaling (DVFS) operation and a thermal throttling operation in response to the real-time measurement information.

BRIEF DESCRIPTION OF THE DRAWINGS

The above and other features of the inventive concept will be more clearly understood by describing in detail embodiments thereof with reference to the accompanying drawings.

DETAILED DESCRIPTION OF THE EMBODIMENTS

Figure 1:
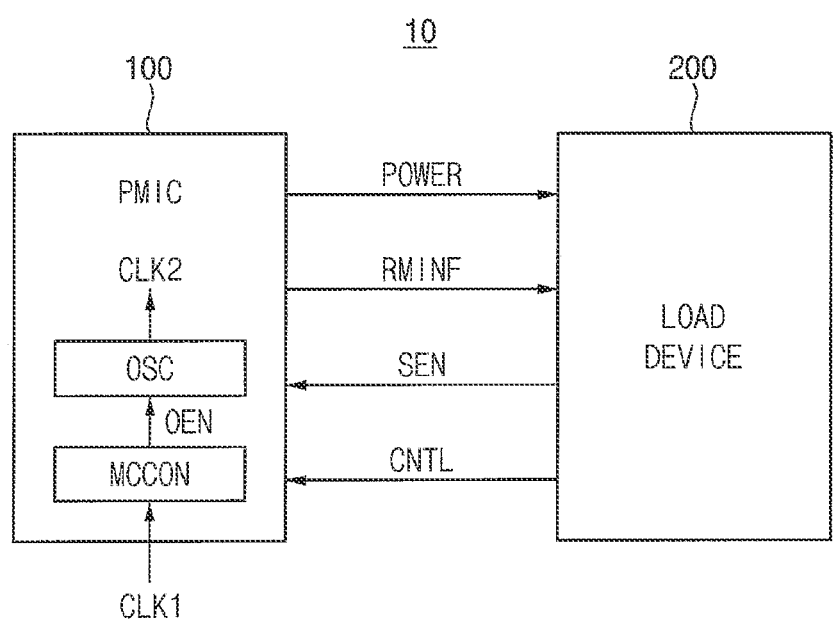
FIG. 1 is a block diagram illustrating an electronic device according to an embodiment of the inventive concept.

Embodiments of the inventive concept provide a power management integrated circuit (PMIC) and an electronic device including the PMIC capable of efficiently providing real-time power information.

Embodiments of the inventive concept will be described more fully hereinafter with reference to the accompanying drawings. Like reference numerals may refer to like elements throughout this application.

FIG. 1 is a block diagram illustrating an electronic device according to an embodiment of the inventive concept.

Referring to FIG. 1, an electronic device 10 includes a power management integrated circuit (PMIC) 100 and a load device 200.

The PMIC 100 may provide power to the load device 200 and provide real-time measurement information RMINF according to a request of the load device 200. As will be described below with reference to FIG. 4, the PMIC 100 may include a plurality of DC-DC converters and/or a plurality of voltage regulators. In embodiments of the inventive concept, the PMIC 100 may measure magnitude of load currents provided to the load device 200, e.g., the load currents of the plurality of voltage regulators, according to the request of the load device 200 in real time.

The PMIC 100 may generate power information indicating the power consumed by the load currents and provide the power information as the real-time measurement information RMINF to the load device 200. As will be described below with reference to FIG. 4, the PMIC 100 may include a conversion circuit configured to convert analog signals indicating the load currents of the plurality of voltage regulators to generate digital signals corresponding to the load currents. The PMIC 100 may generate the power information based on the digital signals.

The PMIC 100 may include a current meter for these functions. The PMIC 100 may measure the load currents using the current meter according to the request of the load device 200 and provide the measured value to the load device 200.

Firstly, the PMIC 100 may receive a sensing request signal SEN with respect to the load currents and a control signal CNTL from the load device 200. Here, the control signal CNTL may include selection information for selecting any one of the plurality of voltage regulators and information about a time or a parameter for calculating average current. In other words, the control signal CNTL may include configuration information for measuring the load currents by the current meter. For example, the control signal CNTL may include time information for calculating a sampling period with respect to the load currents or average current value of a switching regulator.

The PMIC 100 may measure and calculate the load current outputted from a linear or switching regulator selected based on the control signal CNTL. In addition, the PMIC 100 may provide a magnitude of the load current outputted from the measured and calculated linear or switching regulator to the load device 200 as the real-time measurement information RMINF. Here, the real-time measurement information RMINF may be transmitted to the load device 200 in a digital data form.

According to embodiments of the inventive concept, the PMIC 100 may include a measurement cycle controller MCCON and an oscillator OSC. The measurement cycle controller MCCON may operate based a first clock signal CLK1 having a first frequency and generate an oscillation enable signal OEN that is activated during a measurement period. The oscillator OSC may generate a second clock signal CLK2 having a second frequency higher than the first frequency based on the oscillation enable signal OEN and the first clock signal CLK1. A control logic of the PMIC 100 may operate based on the second clock signal CLK2 and generate the power information indicating the power consumed by the load currents during the measurement period. As will be described below, the PMIC 100 may generate battery voltage information indicating a battery voltage and/or temperature information indicating operation temperatures in addition to the power information, and the real-time measurement information RMINF may include the battery voltage information and/or the temperature information in addition to the power information.

As such, the PMIC 100 according to embodiments of the inventive concept may reduce power consumption for power measurement by activating the second clock signal CLK2 only during the measurement period and deactivating the second clock signal CLK2 during an idle period other than the measurement period.

The load device 200 may perform various operations using the real-time measurement information RMINF provided from the PMIC 100. For example, the load device 200 may perform an operation for various service quality improvements or performance improvements based on the real-time measurement information RMINF from the PMIC 100. The load device 200 may perform a power and/or temperature control operation, such as a dynamic voltage and frequency scaling (DVFS) operation or a thermal throttling operation, based on the real-time measurement information RMINF. As a magnitude of load current increases, power consumption increases, and a temperature of the load device 200 increases. Accordingly, when using the real-time measurement information RMINF provided in real time, the load device 200 may rapidly and precisely perform exothermic control. Practical uses of the real-time measurement information RMINF of the load device 200 are not limited to DVFS and thermal throttling, and various other applications are possible.

The load device 200 may periodically request the real-time measurement information RMINF from the PMIC 100. In other words, the load device 200 may transmit the sensing request signal SEN of the load current and the control signal CNTL to the PMIC 100 to obtain the real-time measurement information RMINF. Then, the PMIC 100 measures and calculates the load current with respect to a selected and requested voltage regulator by the load device 200. When the calculation with respect to the load current is completed, the PMIC 100 may provide a ready signal to the load device 200 as will be described below with reference to FIG. 4. In response to the ready signal, the load device 200 may fetch or receive the real-time measurement information RMINF from the PMIC 100.

By using the measured and calculated load current information in real time, the real-time measurement information RMINF having higher availability and accuracy than information obtained by prediction may be provided. Accordingly, various applications such as thermal throttling, power management, etc., in which a magnitude of a real-time load current is used, may be possible.

Figure 2:
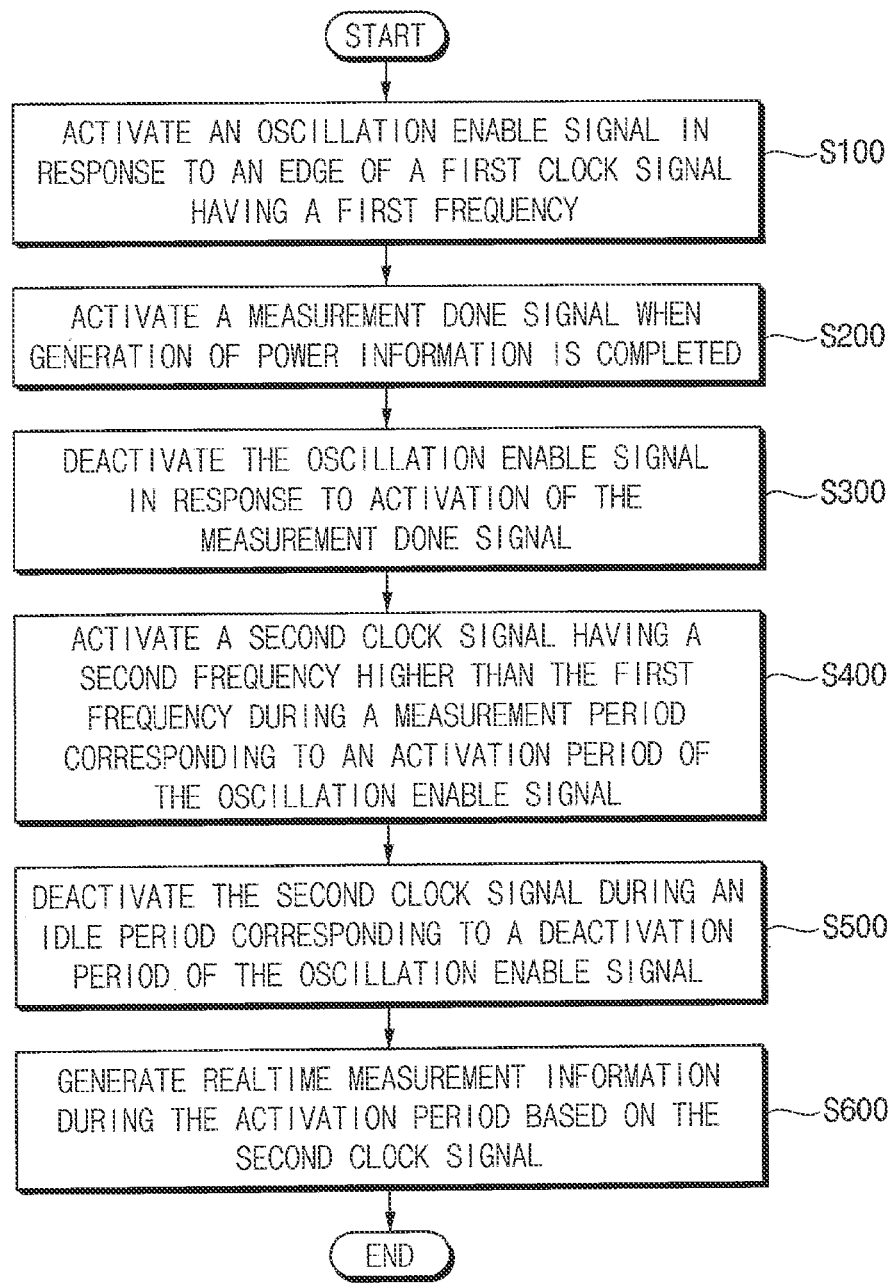
FIG. 2 is a flowchart illustrating a power measurement method according to an embodiment of the inventive concept.

FIG. 2 is a flowchart illustrating a power measurement method according to an embodiment of the inventive concept.

Referring to FIGS. 1 and 2, the measurement cycle controller MCCON of the PMIC 100 may activate the oscillation enable signal (or the measurement enable signal) OEN in response to an edge of the first clock signal CLK1 having the first frequency (S100). The control logic of the PMIC 100 may activate a measurement done signal when generation of the power information is completed (S200). The measurement cycle controller MCCON may deactivate the oscillation enable signal OEN in response to activation of the measurement done signal (S300). The oscillator OSC of the PMIC 100 may activate the second clock signal CLK2 having the second frequency higher than the first frequency during the measurement period corresponding to an activation period of the oscillation enable signal OEN (S400). In addition, the oscillator OSC may deactivate the second clock signal CLK2 during the idle period corresponding to a deactivation period of the oscillation enable signal OEN (S500). The control logic may generate real-time measurement information during the measurement period, e.g., the activation period of the oscillation enable signal OEN, based on the second clock signal CLK2 (S600).

As such, the second clock signal CLK2, which is used in the power measurement, may be activated only during the measurement period, and deactivated during the idle period other than the measurement period, thus reducing power consumption for the power measurement.

Figure 3:
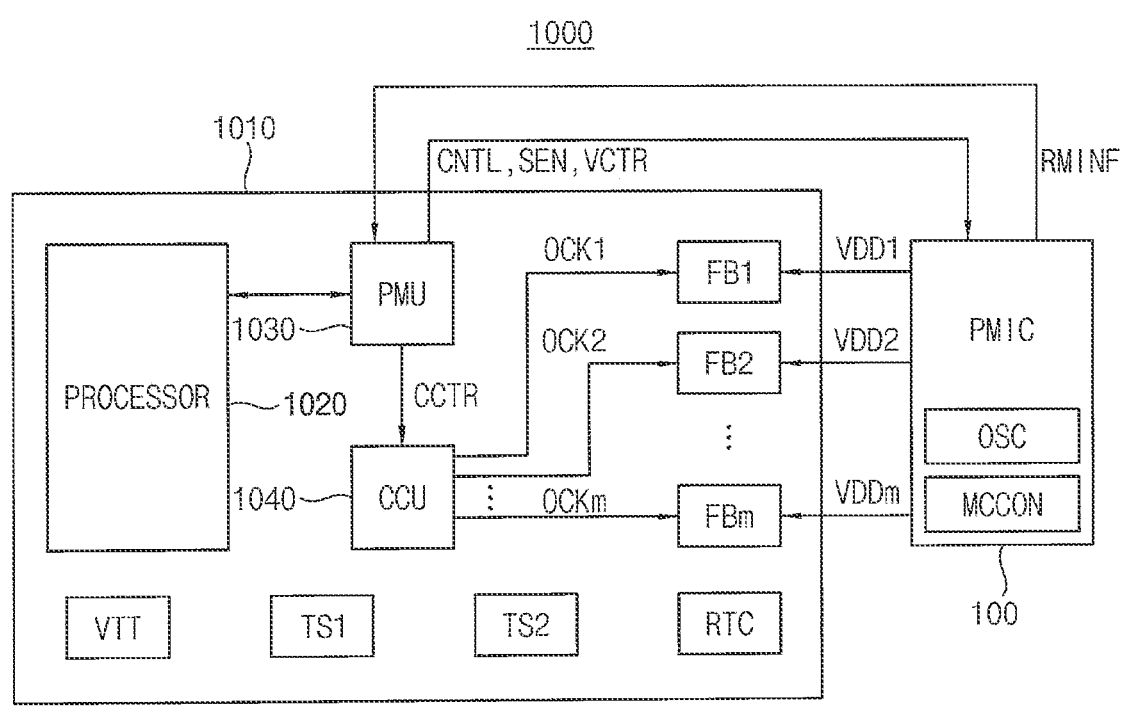
FIG. 3 is a block diagram illustrating an electronic device according to an embodiment of the inventive concept.

FIG. 3 is a block diagram illustrating an electronic device according to an embodiment of the inventive concept.

Referring to FIG. 3, an electronic device 1000 may include a load device 1010 and the PMIC 100.

The load device 1010 may include at least one processor 1020, a power management unit (PMU) 1030, a clock control unit (CCU) 1040, one or more function blocks FB1~FBm, an embedded battery VTT, one or more temperature sensors TS1 and TS2, and a real-time clock circuit RTC.

The load device 1010 may be a system on chip (SoC) in which various elements or components are integrated as one chip. The load device 1010 may be powered by the PMIC 100. The PMIC 100 may include at least one voltage regulator. The PMIC 100 may be referred to as a power supply. According to embodiments of the inventive concept, the PMIC 100 may be implemented as another chip distinct from the chip of the load device 1010, or at least a portion of the PMIC 100 may be included in the load device 1010.

Even though one processor 1020 is illustrated in FIG. 3, the load device 1010 may further include one or more processors or processing units. The processor 1020 may be a central processing unit (CPU) for performing main functions of the load device 1010. The processor 1020 may be configured to perform program instructions, such as those of an operating system (OS).

The embedded battery VTT may provide the power of the electronic device 1000 together with or instead of the PMIC 100. The temperature sensors TS1 and TS2 may be disposed at proper positions (e.g., near heat sources) in the electronic device 1000. The real-time clock circuit RTC may provide time information of the electronic device 1000.

The power management unit 1030 may monitor the operating status or the operating condition of the load device 1010 to determine an operating power level corresponding to the present operating condition. The power level may be represented by at least one of an operating voltage or an operating frequency. In other words, the power level may be changed by changing at least one of the operating voltage and the operating frequency. The operating voltage may be a power supply voltage and the operating frequency may be a frequency of an operating clock signal.

The power management unit 1030 may monitor the operating status or the operating condition, such as the workload, the operating temperature, etc., of the load device 1010 to determine the operating power level corresponding to the present operating condition. For example, when the workload of the load device 1010 increases, the power management unit 1030 may raise the operating power level to increase the operating voltage and/or the operating frequency. In contrast, when the workload of the load device 1010 decreases, the power management unit 1030 may lower the operating power level to decrease the operating voltage and/or the operating frequency.

The power management unit 1030 may generate a voltage control signal VCTR and a clock control signal CCTR, and the PMIC 100 and the clock control unit 1040 may provide the operating voltage and the operating frequency corresponding to the determined operating power level in response to the generated voltage control signal VCTR and the generated clock control signal CCTR, respectively. The operating power level may be altered by changing at least one of the operating voltage and the operating frequency. In embodiments of the inventive concept, the power management unit 1030 may control the power level of a portion of the load device 1010 independently of the power level of another portion of the load device 1010. For example, when the function blocks FB1~FBm are included in different power domains, operating voltages VDD1~VDDm provided to the function blocks FB1~FBm may be controlled independently. In addition, when the function blocks FB1~FBm are included in different clock domains, operating clock signals OCK1~OCKm provided to the function blocks FB1~FBm may be controlled independently.

The function blocks FB1~FBm may perform predetermined functions and may be referred to as intellectual property cores or IP cores. For example, the function blocks FB1~FBm may include a memory controller, a central processing unit (CPU), a display controller, a file system block, a graphic processing unit (GPU), an image signal processor (ISP), a multi-format codec block (MFC), etc. The processor 1020 and the power management unit 1030 may be independent function blocks.

The clock control unit 1040 may generate the operating clock signals (e.g., OCK1 to OCKm) that are provided to the function blocks FB1~FBm. The clock control unit 1040 may include at least one of a phase-locked loop (PLL), a delay-locked loop (DLL), a clock multiplier, or a clock diver.

The power management unit 1030 of the load device 1010 may transfer the sensing request signal SEN to the PMIC

100, and the PMIC 100 may provide the real-time measurement information RMINF to the power management unit 1030 in response to the sensing request signal SEN.

As described above, the PMIC 100 may include the measurement cycle controller MCCON and the oscillator OSC. The measurement cycle controller MCCON may operate in response to a first clock signal having a first frequency and generate an oscillation enable signal that is activated during a measurement period. The oscillator OSC may generate a second clock signal having a second frequency higher than the first frequency in response to the oscillation enable signal. A control logic of the PMIC 100 may operate in response to the second clock signal and generate the power information indicating the power consumed by the load currents during the measurement period. As will be described below, the PMIC 100 may generate battery voltage information indicating a battery voltage and/or temperature information indicating operation temperatures in addition to the power information, and the real-time measurement information RMINF may include the battery voltage information and/or the temperature information in addition to the power information.

As such, the PMIC 100 according to embodiments of the inventive concept may reduce power consumption for power measurement by activating the second clock signal only during the measurement period and deactivating the second clock signal during an idle period other than the measurement period.

Figure 4:
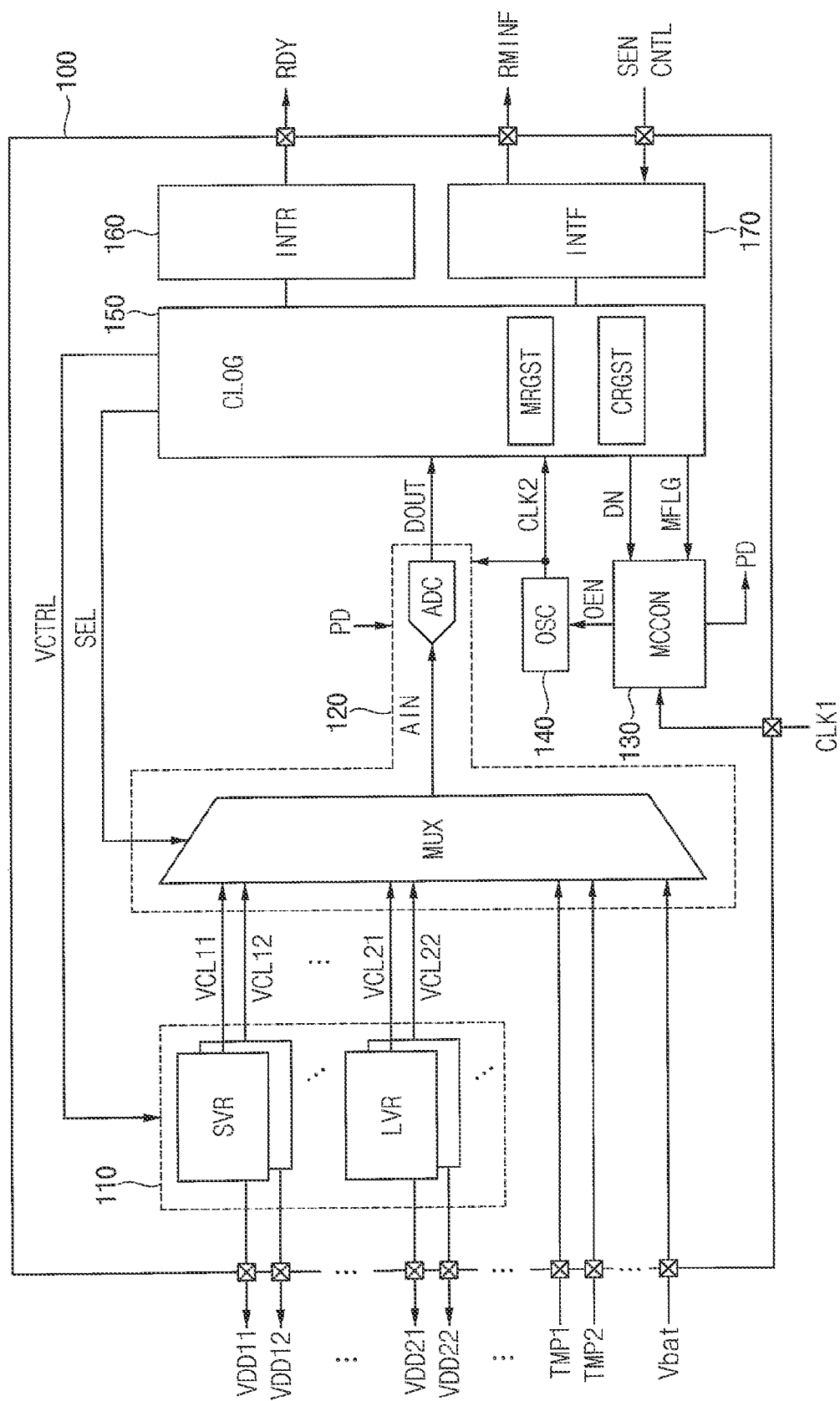
FIG. 4 is a block diagram illustrating a power management integrated circuit (PMIC) according to an embodiment of the inventive concept.

FIG. 4 is a block diagram illustrating a power management integrated circuit (PMIC) according to an embodiment of the inventive concept.

Referring to FIG. 4, the PMIC 100 includes a plurality of voltage regulators 110, a conversion circuit 120, a measurement cycle controller MCCON 130, an oscillator OSC 140, a control logic CLOG 150, an interrupt generator 160, and an interface unit (or interface) 170. Elements of the PMIC 100 may be implemented as circuits. A combination of the conversion circuit 120, the measurement cycle controller 130, the oscillator 140, and the control logic 150 may be referred to as a power meter, which is configured to generate the real-time measurement information RMINF.

The plurality of voltage regulators 110 may generate a plurality of regulator voltages VDD11, VDD12, VDD21, and VDD22 based on a voltage control signal VCTRL provided from the control logic 150.

The plurality of voltage regulators 110 may include one or more switching regulators SVR. The switching regulators SVR may generate the regulator voltages VDD11 and VDD12 provided to the load device 200 as illustrated in FIG. 1. For example, the switching regulators SVR may include at least one of a boost converter, a buck-boost converter, or a buck converter. Each of the switching regulators SVR may output analog signals VCL11 and VCL12.

In addition, the plurality of voltage regulators 110 may include one or more linear regulators LVR such as low drop out (LDO) regulators. The linear regulators LVR may generate the regulator voltages VDD21 and VDD22 provided to the load device 200 as illustrated in FIG. 4. Each of the linear regulators LVR may control a magnitude of voltage drop according to a level of output voltage. Each of the linear regulators LVR may include a current meter. Each of the linear regulators LVR may output analog signals VCL21 and VCL22 through a corresponding current meter. The analog signals VCL21 and VCL22 may have level information of load currents and may be electric signals.

The conversion circuit 120 may include a selector MUX and an analog-to-digital converter ADC.

The selector MUX may select at least one of the analog signals VCL11, VCL12, VCL21, and VCL22 outputted from the switching regulators SVR and the linear regulators LVR based on a selection signal SEL from the control logic 150, and output an input analog signal AIN corresponding to the at least one of the analog signals VCL11, VCL12, VCL21, and VLC22. In embodiments of the inventive concept, the selection signal SEL may have a value that is sequentially changed to sequentially select the analog signals VCL11, VCL12, VCL21, and VCL22. In this case, the input analog signal AIN may sequentially include the analog signals VCL11, VCL12, VCL21, and VCL22. For example, the selector MUX may be implemented with a multiplexer.

In embodiments of the inventive concept, the selector MUX may further receive an analog signal Vbat indicating a battery voltage of a battery disposed outside the PMIC 100 and analog signals TMP1 and TMP2 indicating operation temperatures that are provided from temperature sensors disposed outside the PMIC 100. In this case, the selector MUX may select at least one of the received analog signals VCL11, VCL12, VCL21, VCL22, Vbat, TMP1, and TMP2 to output as the input analog signal AIN.

The analog-to-digital converter ADC may convert the input analog signal AIN to digital signals DOUT. In other words, the analog-to-digital converter ADC may convert the analog signals VCL11, VCL12, VCL21, and VCL22 indicating magnitudes of load currents, the analog signal Vbat indicating the battery voltage, and the analog signals TMP2 and TMP2 indicating the operation temperatures of the electronic device into a discrete signal or a digital code. In embodiments of the inventive concept, the analog-to-digital converter ADC may be a successive approximation register (SAR) analog-to-digital converter as will be described below with reference to FIG. 15, but the inventive concept is not limited thereto. In embodiments of the inventive concept, the analog-to-digital converter ADC may be implemented with various devices such as a digital signal modulator (DSM).

The measured information may be provided to the control logic 150 as the digital signals DOUT. FIG. 4 illustrates a non-limiting example where the digital signals DOUT are provided to the control logic 150 as a serial signal. In embodiments of the inventive concept, the conversion circuit 120 may further include a demultiplexer disposed between the analog-to-digital converter ADC and the control logic 150, and the digital signals DOUT respectively corresponding to the analog signals may be provided to the control logic 150 as parallel signals using the demultiplexer.

The control logic 150 may receive the sensing request signal SEN and the control signal CNTL from the load device 200 through the interface unit 170. In response to the sensing request signal SEN and the control signal CNTL, the control logic 150 may select at least one of the analog signals VCL11, VCL12, VCL21, VCL22, Vbat, TMP1, and TMP2 by controlling the selector MUX. The control logic 150 may generate the selection signal SEL for selecting at least one of the analog signals VCL11, VCL12, VCL21, VCL22, Vbat, TMP1, and TMP2, and provide the selection signal SEL to the selector MUX. The selection signal SEL may be implemented as a code for selecting an output of a multiplexer.

The control logic 150 may include a control register CRGST and a measurement register MRGST. The control logic 150 may store, in the control register CRGST, control values or control bits which are determined based on the sensing request signal SEN and the control signal CNTL provided from the load device 200. The control values stored in the control register CRGST and measurement modes will be described with reference to FIGS. 6 and 7.

The control logic 150 may store, in the measurement register MRGST, the real-time measurement information RMINF which are generated based on the digital signals DOUT according to the request of the load device 200. For example, the power information selected from the switching regulators SVR may be stored in a first region of the measurement register MRGST and the power information selected from the linear regulators LVR may be stored in a second region of the measurement register MRGST. In addition, the battery voltage information and/or the temperature information may be stored in respectively-designated regions of the measurement register MRGST.

When the real-time measurement information RMINF is stored in the measurement register MRGST, the control logic 150 may transmit a ready signal RDY to the load device 200. After that, the load device 200 may fetch the real-time measurement information RMINF stored in the measurement register MRGST through the interface unit 170.

The interrupt generator 160 may generate the ready signal RDY under the control of the control logic 150 and provide the ready signal RDY to the load device 200. In response to the ready signal RDY from the interrupt generator 160, the load device 200 may fetch or be ready to receive the real-time measurement information RMINF. FIG. 4 illustrates an example embodiment where the transfer timing of the real-time measurement information RMINF is determined using the ready signal RDY, but the inventive concept is not limited thereto.

The interface unit (or interface) 170 may substantially exchange data with the load device 200. The interface unit 170 may provide the sensing request signal SEN and the control signal CNTL from the load device 200 to the control logic 150 with a data form or a signal form. Furthermore, the interface unit 170 may provide an interface such that the load device 200 may access the real-time measurement information RMINF stored in the measurement register MRGST of the control logic 150. For example, the interface unit 170 may be an interface device such as an inter-integrated (I2C) interface, an improved inter-integrated (I3C) interface, a system power management interface (SPMI), a serial peripheral interface (SPI), and so on, which is sharable with a mobile application processor.

The measurement cycle controller 130 may operate based on the first clock signal CLK1 having a first frequency and generate the oscillation enable signal OEN that is activated during a measurement period. The oscillator 140 may generate the second clock signal CLK2 having a second frequency higher than the first frequency based on the oscillation enable signal OEN. For example, the first frequency of the first clock signal CLK1 may be several kHz and the second frequency of the second clock signal CLK2 may be higher than several hundred kHz. The ratio of the first frequency and the second frequency may be determined based on the required performance and the power policy of the electronic device.

In embodiments of the inventive concept, the first clock signal CLK1 provided to the measurement cycle controller 130 may be provided from outside of the PMIC 100 as illustrated in FIG. 4. For example, the first clock signal CLK1 may be the same as a clock signal provided to the real-time clock circuit RTC as illustrated in FIG. 3.

In embodiments of the inventive concept, the PMIC 100 may further include an additional oscillator to provide the first clock signal CLK1, and an oscillation signal generated by the additional oscillator may be provided to the measurement cycle controller 130 as the first clock signal CLK1.

The control logic 150 may operate based on the second clock signal CLK2 and generate the real-time measurement information RMINF including the power information during the measurement period based on the digital signals DOUT. As described above, the real-time measurement information RMINF may include the battery voltage information indicating the battery voltage and/or the temperature information indicating the operation temperatures in addition to the power information indicating the power consumed by the load currents of the plurality of voltage regulators 110.

The control logic 150 may generate a measurement done signal DN that is activated when generation of the real-time measurement information RMINF is completed, and provide the measurement done signal DN to the measurement cycle controller 130. For example, the control logic 150 may activate the measurement done signal DN after the real-time measurement information RMINF is stored in the measurement register MRGST.

In addition, the control logic 150 may generate a measurement flag signal MFLG indicating whether to generate the real-time measurement information RMINF based on the sensing request signal (or the power request signal) SEN provided from the load device 200, and provide the measurement flag signal MFLG to the measurement cycle controller 130. Example operations based on the measurement done signal DN and the measurement flag signal MFLG will be described with reference to FIG. 5.

In embodiments of the inventive concept, the conversion circuit 120 may operate based on the second clock signal CLK2. As described above, the second clock signal CLK2 is activated only during the measurement period to generate the real-time measurement information RMINF. Thus, the conversion circuit 120 may be disabled to stop the conversion operation during the idle period other than the measurement period, and thus power consumption may be reduced.

In embodiments of the inventive concept, the measurement cycle controller 130 may generate a power-down signal PD that is activated during the idle period other than the measurement period, and provide the power-down signal PD to the conversion circuit 120. The conversion circuit 120 may be enabled during a deactivation period of the power-down signal PD to generate the digital signals DOUT, and may be disabled during an activation period of the power-down signal PD. In this case, the conversion circuit 120 may be disabled to stop the conversion operation during the idle period and power consumption may be reduced, even when the conversion circuit 120 operates based on a clock signal other than the second clock signal CLK2.

Figure 5:
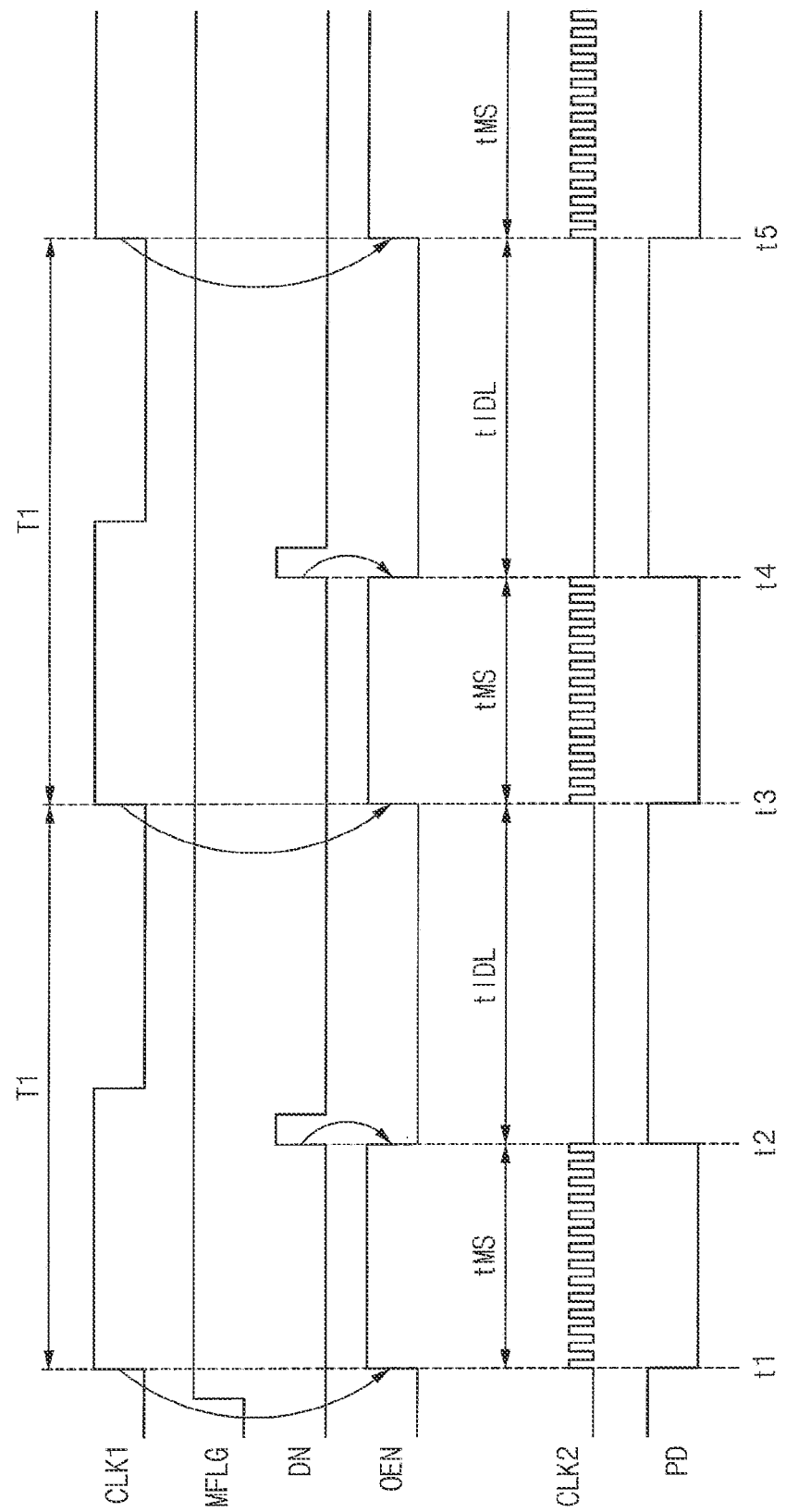
FIG. 5 is a timing diagram illustrating an operation of a PMIC according to an embodiment of the inventive concept.

FIG. 5 is a timing diagram illustrating an operation of a PMIC according to an embodiment of the inventive concept.

Referring to FIGS. 4 and 5, the control logic 150 may activate the measurement flag signal MFLG when the sensing request signal SEN from the load device 200 indicates that the generation of the real-time measurement information RMINF is required. In addition, the control logic 150 may activate the measurement done signal DN at time points t2 and t4 when the generation of the real-time measurement information RMINF is completed. For example, the control logic 150 may activate the measurement done signal DN in a form of pulses as illustrated in FIG. 5.

The measurement cycle controller 130 may enable the oscillator 140 by activating the oscillation enable signal OEN in response to an edge of the first clock signal CLK1, e.g., at time points t1, t3, and t5. In addition, the measurement cycle controller 130 may disable the oscillator 140 by deactivating the oscillation enable signal OEN in response to activation of the measurement done signal DN.

The oscillator 140 may be enabled during a measurement period tMS corresponding to an activation period of the oscillation enable signal OEN to activate the second clock signal CLK2 during the measurement period tMS. The oscillator 140 may be disabled during an idle period tIDL corresponding to a deactivation period of the oscillation enable signal OEN to deactivate the second clock signal CLK2 during the idle period tIDL. The measurement cycle controller 130 may activate the power-down signal PD during the idle period tIDL other than the measurement period tMS.

As such, the PMIC 100 according to embodiments of the inventive concept may reduce power consumption for power measurement by activating the second clock signal CLK2 only during the measurement period tMS and deactivating the second clock signal CLK2 during the idle period tIDL.

As will be described below with reference to FIGS. 6 and 7, a duration time interval of the measurement period tMS may be changed depending on a sensing request from the load device 200. A cycle period T1 of the first clock signal CLK1 may be greater than a maximum time interval of the measurement period tMS. Here, the maximum time interval of the measurement period tMS may correspond to the duration time interval of the measurement period tMS when the real-time measurement information RMINF requested by the load device 200 includes all of the information that the PMIC 100 can provide.

Figures 6, 7:
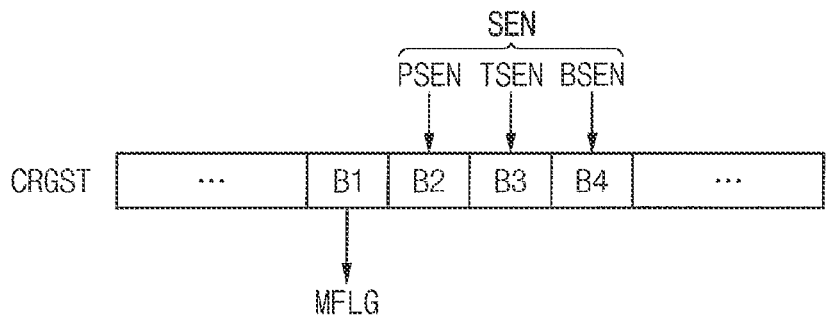
FIG. 6 is a diagram illustrating information stored in a control register included in a PMIC according to an embodiment of the inventive concept.
FIG. 7 is a diagram illustrating measurement modes of a PMIC according to an embodiment of the inventive concept.

FIG. 6 is a diagram illustrating information stored in a control register included in a PMIC according to embodiments of the inventive concept, and FIG. 7 is a diagram illustrating measurement modes of a PMIC according to an embodiment of the inventive concept.

FIG. 6 illustrates an example of control values B1~B4, which are a portion of the control values stored in the control register CRGST as illustrated in FIG. 4. For example, each of the control values B1~B4 may be one bit, but the inventive concept is not limited thereto.

The sensing request signal SEN transmitted from the load device 200 may include a power request signal PSEN indicating whether to provide the power information, a battery voltage request signal BSEN indicating whether to provide the battery voltage information, and a temperature request signal TSEN indicating whether to provide the temperature information.

The control logic 150 may receive the power request signal PSEN, the battery voltage request signal BSEN, and the temperature request signal TSEN, and determine a measurement mode based on the power request signal PSEN, the battery voltage request signal BSEN, and the temperature request signal TSEN. The duration time interval of the measurement period tMS as illustrated in FIG. 5 may be determined based on the determined measurement mode.

The control logic 150 may set the control values B2~B4 such that the control values corresponding to the activated request signals are set to a first value (e.g., a value of "1") and the control values corresponding to the deactivated request signals are set to a second value (e.g., a value of "0"). The control logic 150 may set the control value B1 to generate the measurement flag signal MFLG based on the control values respectively indicating activation or deactivation of the power request signal PSEN, the battery voltage request signal BSEN, and the temperature request signal TSEN.

FIG. 7 illustrates example measurement modes NOP and MD1~MD7 corresponding to the control values B1~B4, e.g., the measurement flag signal MFLG, the power request signal PSEN, the battery voltage request signal BSEN, and the temperature request signal TSEN.

When all of the power request signal PSEN, the battery voltage request signal BSEN, and the temperature request signal TSEN are deactivated, the control logic 150 may set the control value B1 corresponding to the measurement flag signal MFLG to the value of "0" and deactivate the measurement flag signal MFLG based on the control value B1. NOP indicates a non-measurement mode in which the measurement operation is not required.

When at least one of the power request signal PSEN, the battery voltage request signal BSEN, and the temperature request signal TSEN is activated, the control logic 150 may set the control value B1 corresponding to the measurement flag signal MFLG to the value of "1" and activate the measurement flag signal MFLG based on the control value B1. First through seventh measurement modes MD1~MD7 indicate the various measurement modes depending on the activation or the deactivation of the power request signal PSEN, the battery voltage request signal BSEN, and the temperature request signal TSEN.

In FIG. 7, tPM indicates a required time for generating the power information, tTM indicates a required time for generating the temperature information, and tBM indicates a required time for generating the battery voltage information. The information on the required times tPM, tTM, and tBM may be determined according to the number of the voltage regulators, the number of the temperature sensors, and the number of the batteries, respectively, which are included in the electronic device and required to be monitored by the PMIC 100.

In the first measurement mode MD1 where all of the power request signal PSEN, the battery voltage request signal BSEN, and the temperature request signal TSEN are activated, the duration time interval of the measurement period tMS may correspond to the maximum time interval tPM+tTM+tBM. As described above, the cycle period T1 of the first clock signal CLK1 may be greater than the maximum time interval tPM+tTM+tBM of the measurement period tMS.

In embodiments of the inventive concept, as will be described below with reference to FIGS. 8 and 9, the measurement cycle controller 130 may enable the oscillator 140 by activating the oscillation enable signal OEN at the edge of the first clock signal CLK1 regardless of the measurement flag signal MFLG.

In embodiments of the inventive concept, as will be described below with reference to FIGS. 10 and 11, the measurement cycle controller 130 may determine whether to activate the oscillation enable signal OEN at the edge of the first clock signal CLK1 based on the measurement flag signal MFLG.

Hereinafter, descriptions of elements already described with reference to the timing diagram of FIG. 5 may be omitted.

Figure 8:
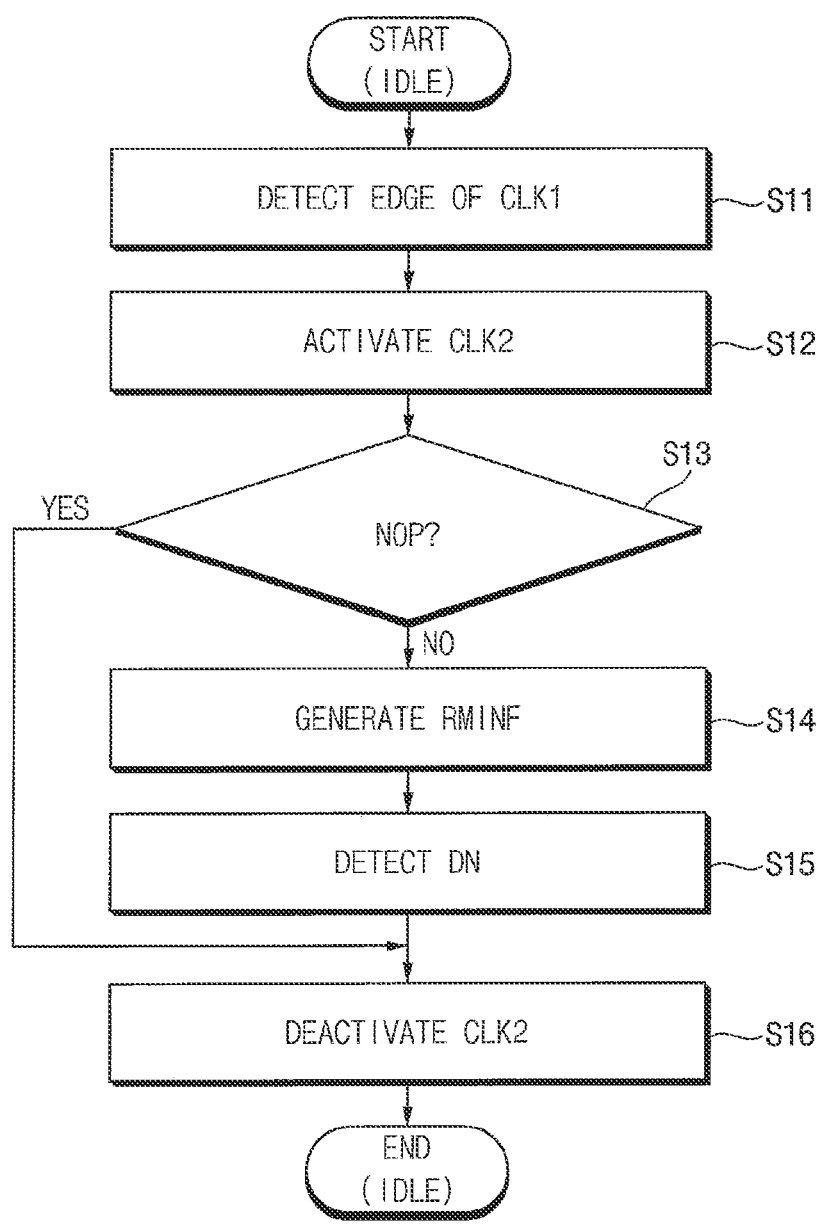
FIG. 8 is a flowchart illustrating a power measurement method according to an embodiment of the inventive concept.
Figure 9:
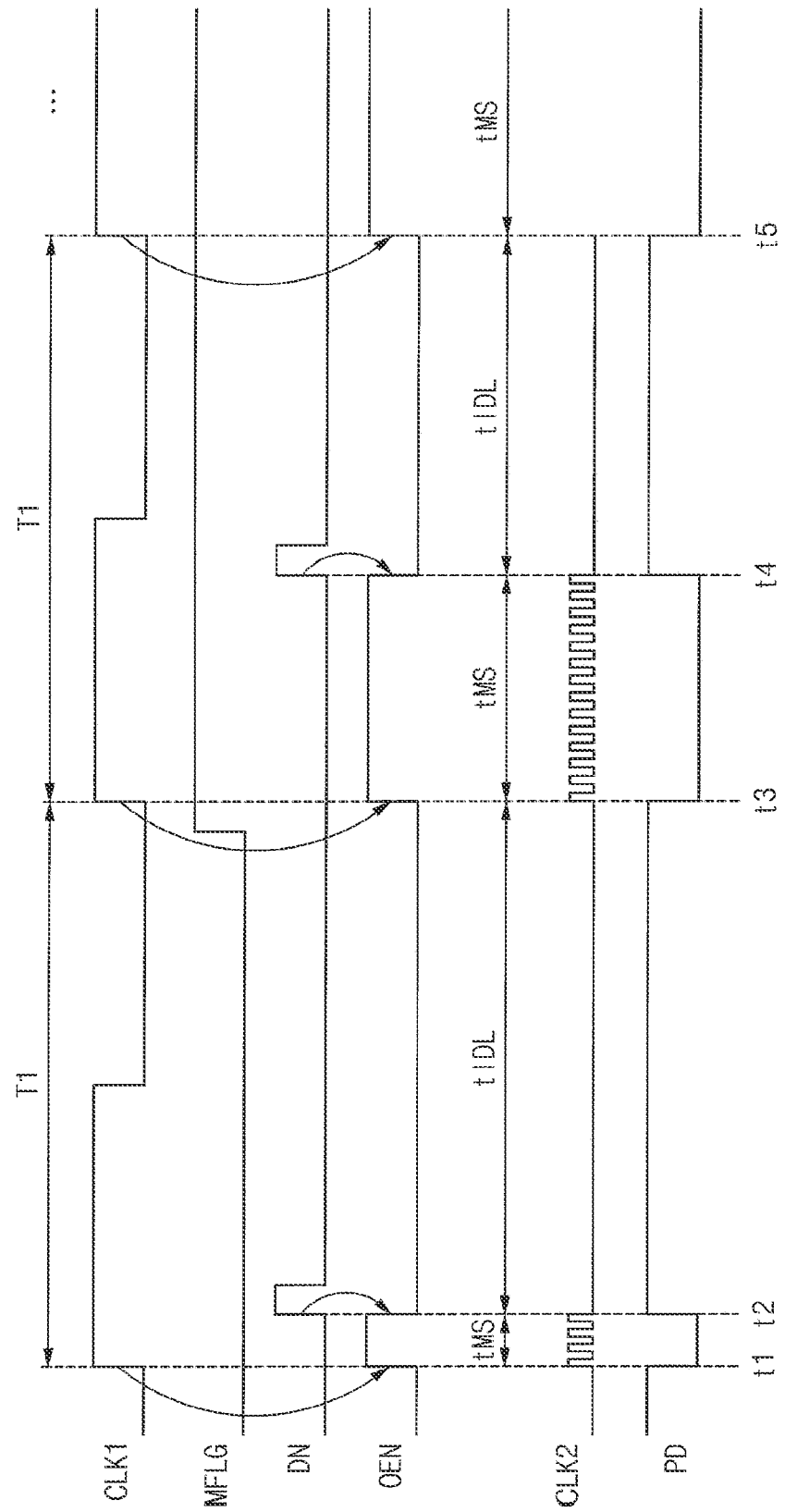
FIG. 9 is a timing diagram illustrating an operation of a PMIC performing the power measurement method of FIG. 8 according to an embodiment of the inventive concept.

FIG. 8 is a flowchart illustrating a power measurement method according to embodiments of the inventive concept, and FIG. 9 is a timing diagram illustrating an operation of a PMIC performing the power measurement method of FIG. 8 according to an embodiment of the inventive concept.

Referring to FIGS. 8 and 9, during the idle mode tIDL while the second clock signal CLK2 is deactivated, the measurement cycle controller 130 may detect an edge (e.g., a rising edge) of the first clock signal CLK1 (S11), and activate the oscillation enable signal OEN in response to the edge of the first clock signal CLK1, e.g., at time points t1, t3, and t5. As described above, the oscillator 140 may activate the second clock signal CLK2 in response to the activation of the oscillation enable signal OEN (S12). In other words, the measurement cycle controller 130 may activate always the second clock signal CLK2 at the edge of the first clock signal CLK1 regardless of the measurement flag signal MFLG.

The control logic 150 may determine, based on the control values of the control register CRGST, whether the generation of the real-time measurement information RMINF is not required, e.g., whether the measurement mode is the non-measurement mode NOP (S13).

When the measurement mode is determined as the non-measurement mode NOP (S13: YES), the control logic 150 may activate the measurement done signal DN and the measurement cycle controller 130 may deactivate the oscillation enable signal OEN. In response to the deactivation of the oscillation enable signal OEN, e.g., at time point t1, the oscillator 140 may deactivate the second clock signal CLK2 (S16) and enter the idle mode tIDL. As such, in the case of the non-measurement mode NOP, the measurement operation may not be performed during the measurement period tMS corresponding to the time interval t1~t2, and the control logic 150 may activate the measurement done signal DN instantaneously after the control logic 150 determines the non-measurement mode NOP.

When the measurement mode is not determined as the non-measurement mode NOP (S13: NO), the control logic 150 may perform the measurement operation corresponding to the measurement mode based on the activated second clock signal CLK2 and generate the real-time measurement information RMINF (S14). After the generation of the real-time measurement information RMINF is completed, e.g., at time point t4, the control logic 150 may activate the measurement done signal DN.

The measurement cycle controller 130 may detect the measurement done signal DN (S15), and deactivate the oscillation enable signal OEN in response to the activation of the measurement done signal DN. The oscillator 140 may be disabled in response to the deactivation of the oscillation enable signal OEN to deactivate the second clock signal CLK2 (S16) and then enter the idle mode tIDL.

Such operations may be repeated per cyclic period T1 of the first clock signal CLK1.

Figure 10:
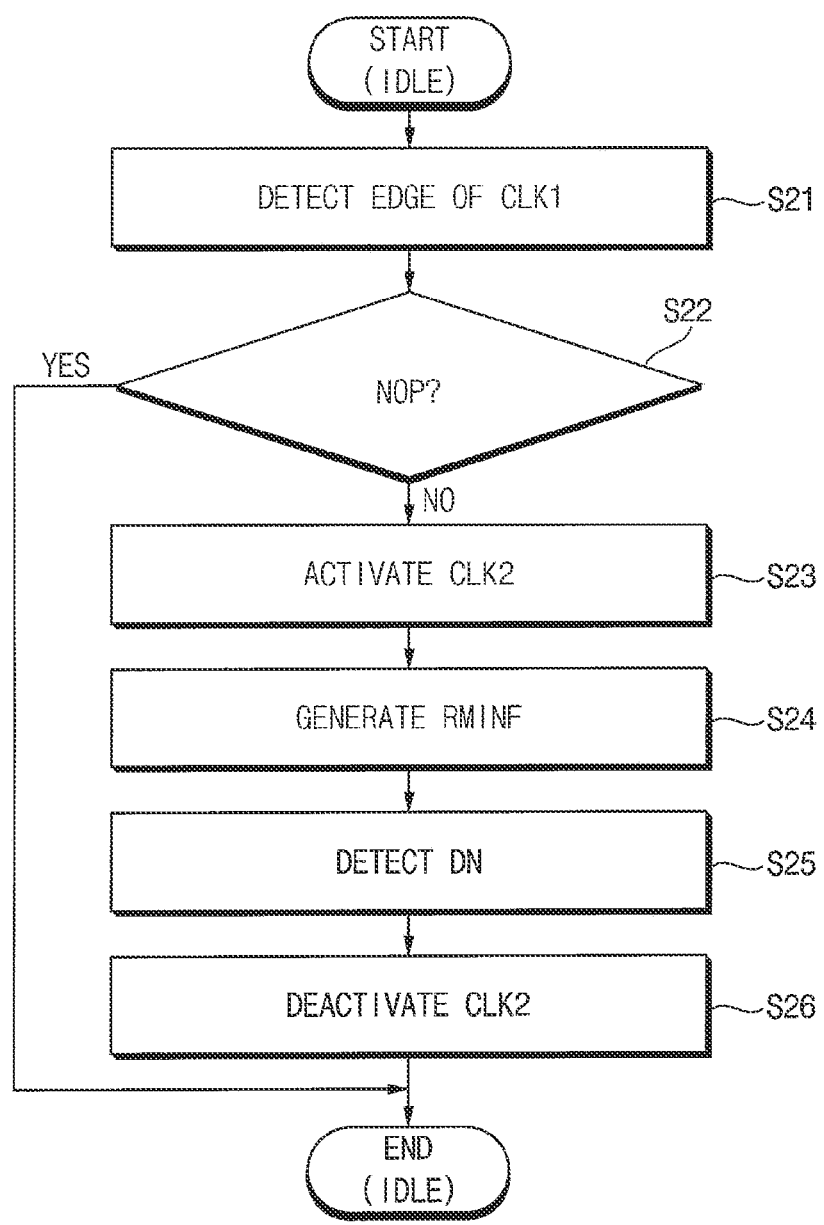
FIG. 10 is a flowchart illustrating a power measurement method according to an embodiment of the inventive concept.
Figure 11:
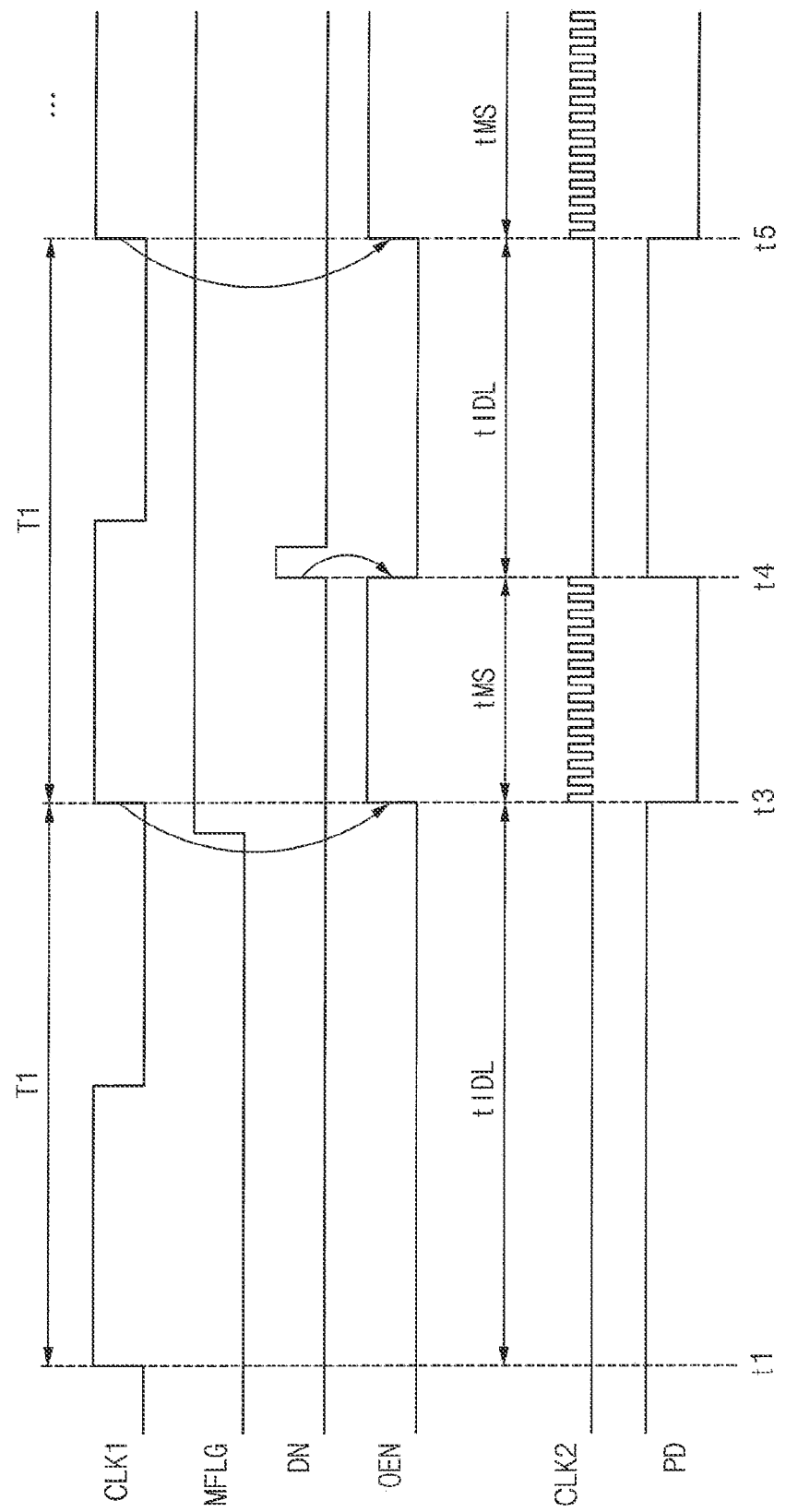
FIG. 11 is a timing diagram illustrating an operation of a PMIC performing the power measurement method of FIG. 10 according to an embodiment of the inventive concept.

FIG. 10 is a flowchart illustrating a power measurement method according to an embodiment of the inventive concept, and FIG. 11 is a timing diagram illustrating an operation of a PMIC performing the power measurement method of FIG. 10 according to an embodiment of the inventive concept.

Referring to FIGS. 10 and 11, during the idle mode tIDL while the second clock signal CLK2 is deactivated, the measurement cycle controller 130 may detect an edge (e.g., a rising edge) of the first clock signal CLK1 (S21), and determine whether the measurement mode is the non-measurement mode NOP (S22) in response to the edge of the first clock signal CLK1, e.g., at time points t1, t3, and t5. For example, the measurement cycle controller 130 may determine whether the measurement mode is the non-measurement mode NOP based on the activation of the measurement flag signal MFLG provided from the control logic 150.

When the measurement mode is determined as the non-measurement mode NOP (S22: YES), e.g., when the measurement flag signal MFLG is deactivated at time point t1 corresponding to the edge of the first clock signal CLK1, the control logic 150 may maintain the deactivation of the oscillation enable signal OEN and enter the idle mode tIDL.

When the measurement mode is not determined as the non-measurement mode NOP (S22: NO), e.g., when the measurement flag signal MFLG is activated at time points t3 and t5 corresponding to the edge of the first clock signal CLK1, the measurement cycle controller 130 may activate the oscillation enable signal OEN and the oscillator 140 may activate the second clock signal CLK2 in response to the activation of the oscillation enable signal OEN (S23).

The control logic 150 may perform the measurement operation corresponding to the measurement mode based on the activated second clock signal CLK2, and generate the real-time measurement information RMINF (S24). After the generation of the real-time measurement information RMINF is completed, e.g., at time point t4, the control logic 150 may activate the measurement done signal DN.

The measurement cycle controller 130 may detect the measurement done signal DN (S25), and deactivate the oscillation enable signal OEN in response to the activation of the measurement done signal DN. The oscillator 140 may be disabled in response to the deactivation of the oscillation enable signal OEN to deactivate the second clock signal CLK2 (S26) and then enter the idle mode tIDL.

Such operations may be repeated per cyclic period T1 of the first clock signal CLK1.

In the example embodiments described with reference to FIGS. 8 and 9, the measurement flag signal MFLG may not be provided to the measurement cycle controller 130 because the control logic 150 determines whether the measurement mode corresponds to the non-measurement mode NOP. In contrast, in the example embodiments described with reference to FIGS. 10 and 11, the measurement flag signal MFLG may be provided to the measurement cycle controller 130 and the measurement cycle controller 130 may determine whether the measurement mode corresponds to the non-measurement mode NOP based on the measurement flag signal MFLG.

Figure 12:
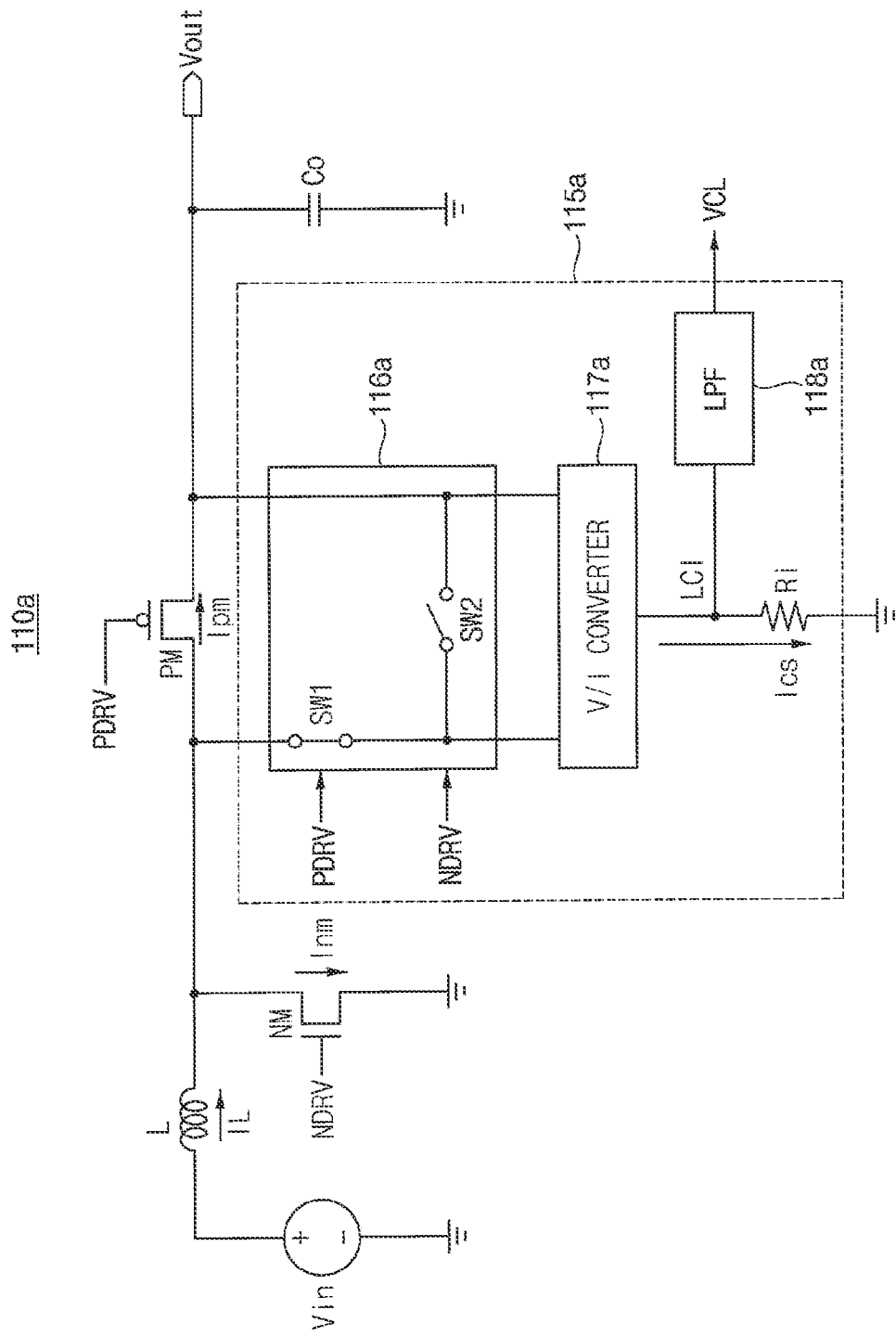
FIG. 12 is a diagram illustrating a switching regulator included in a PMIC according to an embodiment of the inventive concept.

FIG. 12 is a diagram illustrating a switching regulator included in a PMIC according to an embodiment of the inventive concept.

In particular, FIG. 12 illustrates a boost converter 110a as an example of a switching regulator, which provides an output voltage higher than an input voltage. The boost converter 100a may include a current meter for measuring a channel current Ipm of a p-channel metal oxide semiconductor (PMOS) transistor PM corresponding to load current.

The boost converter 110a may include an inductor L, switch stages NM and PM, an output capacitor Co, and a current meter 115a. A power Vin supplied with DC voltage is connected to a terminal of the inductor L. For example, the power Vin may be supplied by a battery. Moreover, in response to driving signals PDRV and NDRV, the switch stages NM and PM may be composed of the PMOS transistor PM and an n-channel metal oxide semiconductor (NMOS) transistor NM, respectively, which complementarily turn on or turn off. Current to flow to the inductor L by switching off the PMOS transistor PM and the NMOS transistor NM is regulated and is supplied to a load side. Here, if the output capacitor Co has a relatively large capacitance, pulsation of an output voltage Vout is suppressed and is outputted with a DC form.

The current meter 115a may be configured to measure the channel current Ipm to flow to the PMOS transistor PM. In other words, the current meter 115a may detect a voltage difference of a drain-source terminal of the PMOS transistor PM and calculate the current Ipm to flow to the PMOS transistor PM. Moreover, the current meter 115a may calculate an average of discontinuous (or varying) channel current of the PMOS transistor PM. The average may be supplied as the power information included in the real-time measurement information RMINF that denotes magnitude of the channel current (or load current) Ipm. Here, the power information may be supplied as a voltage or current level or code data.

The load current substantially supplied to a load in the boost converter 110a is not an inductor current IL that flows to the inductor L but the channel current Ipm that flows to the PMOS transistor PM to supply a current to a load side. Accordingly, the current meter 115a measures the channel current Ipm of the PMOS transistor PM and calculates an average value of the channel current Ipm. The average value may be used as magnitude of the load current.

In embodiments of the inventive concept, as illustrated in FIG. 12, the current meter 115a may include an input selection unit (or input selector) 116a, a voltage-current converter 117a, a resistor Ri, and a low pass filter (LPF) 118a. The selection unit 116a supplies drain-source voltage to the voltage-current converter 117a as a differential voltage when the PMOS transistor PM is turned on. On the other hand, the input selection unit 116a may supply the differential voltage of 0 V to the voltage-current converter 117a when the PMOS transistor PM is turned off.

For this operation, a first switch SW1 should be turned on and a second switch SW2 should be turned off, when the PMOS transistor PM is turned on (e.g., when PDRV is at a low level). On the contrary, the first switch SW1 may be turned off and the second switch SW2 may be turned on, when the PMOS transistor PM is turned off (e.g., when PDRV is at a high level). Here, the driver signals PDRV and NDRV for driving the PMOS transistor PM and the NMOS transistor NM may be supplied with the same signal or the same level.

When the PMOS transistor PM is turned on, the voltage-current converter 117a detects differential voltage of the drain-source terminal of the PMOS transistor PM and transforms the detected differential voltage into a current signal. For example, the differential voltage of the drain-source terminal of the PMOS transistor PM may be transformed into current using a resistor included in the voltage-current converter 117a. The resistor included in the voltage-current converter 117a may have substantially the same magnitude as the turn-on resistance of the PMOS transistor PM. Here, a current Ics outputted by the voltage-current converter 117a flows to the resistor Ri. The current Ics flowing to the resistor Ri is detected as a voltage value LCI, and supplied as an analog signal VCL indicating the load current averaged by the LPF 118a. Here, the LPF 118a may use at least one of various smoothing circuits.

As described above, an example of the current meter 115a for measuring the channel current Ipm of the PMOS transistor PM having substantially the same magnitude as the load current is described. However, a current measurement method or a configuration of the current meter 115a may be variously changed. Various types of current meters may be included in the PMIC 100 to measure the load current in real time.

Figure 13:
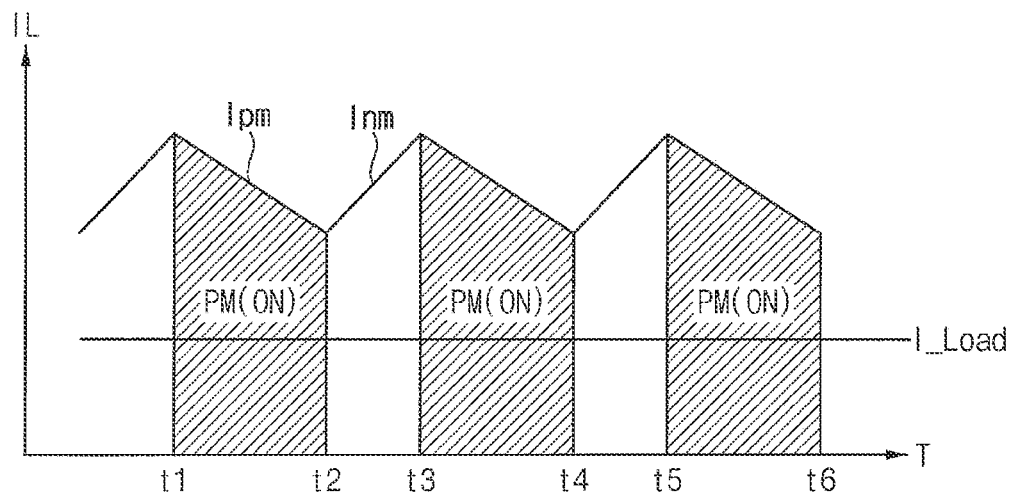
FIG. 13 is a waveform diagram illustrating an operation of a current meter included in the switching regulator of FIG. 12 according to an embodiment of the inventive concept.

FIG. 13 is a waveform diagram illustrating an operation of a current meter included in the switching regulator of FIG. 12 according to an embodiment of the inventive concept.

Referring to FIGS. 12 and 13, the current meter 116a may measure only the current of the PMOS transistor PM and may serve the measured current as a load current I_Load through an average operation.

Firstly, referring to a waveform of the inductor current IL to flow to the inductor L, the inductor current IL is changed by a switching operation of the switch stages PM and NM. It is assumed that the NMOS transistor NM is turned on and the PMOS transistor PM is turned off in an initial state and the inductor current IL vertically increases. At time point t1, the NMOS transistor NM is turned off and the PMOS transistor PM is turned on. Here, the current Ipm to flow to the PMOS transistor PM may contribute to the load current I_Load.

The voltage or the current of a proper level may be continuously supplied as a load by complementarily switching of the NMOS transistor NM and the PMOS transistor PM through this method. The current Ipm of the PMOS transistor PM contributing to the load current I_Load is a portion drawn with diagonal lines. Accordingly, the current Ipm of the PMOS transistor PM of the portion drawn with the diagonal lines is discontinuous. A magnitude of this discontinuous current is supplied as a DC component accompanied by an averaging operation. As such, a magnitude of the load current I_Load substantially supplied as the load may be determined by averaging the current Ipm when the PMOS transistor PM is turned on with respect to a period (e.g., t1~t3).

The current meter 115a may measure the current Ipm of the PMOS transistor PM, which is discontinuously supplied in the PMIC 100. Moreover, magnitude information of the load current I_Load measured by the current meter 115a may be supplied to the load device 200 as the power information in real time.

Figure 14:
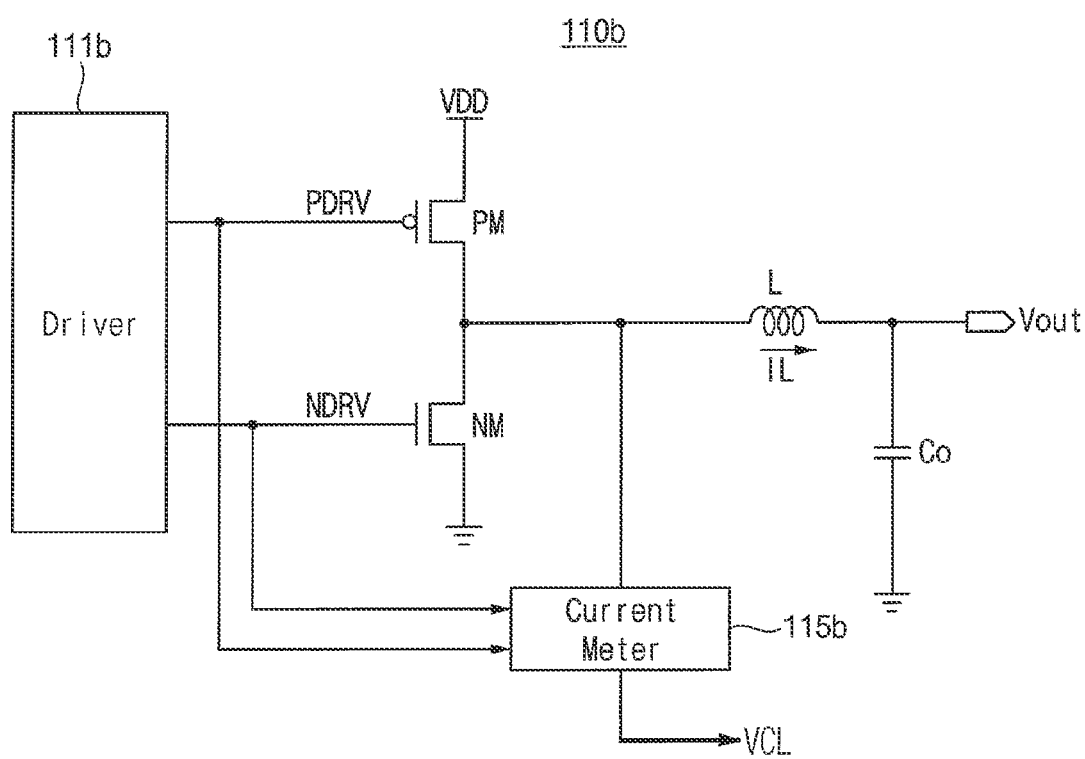
FIG. 14 is a diagram illustrating a switching regulator included in a PMIC according to an embodiment of the inventive concept.

FIG. 14 is a diagram illustrating a switching regulator included in a PMIC according to an embodiment of the inventive concept.

Referring to FIG. 14, a switching regulator 110b composed of a buck converter may include a current meter 115b.

One terminal of the PMOS transistor PM may be connected to a node for receiving an input voltage VDD. The NMOS transistor NM may be connected between the other terminal of the PMOS transistor PM and a ground node. Each of the PMOS transistor PM and the NMOS transistor NM may be controlled by a first driving signal PDRV and a second driving signal NDRV. The switching regulator 110b may include a driver 111b to provide the first driving signal PDRV and the second driving signal NDRV.

A level of the output voltage Vout may be determined by the first driving signal PDRV and the second driving signal NDRV generated by the driver 111b. In other words, the driver 111b may control charge and discharge with respect to the inductor L and the output capacitor Co with a pulse width modulation method and control the level of the output voltage Vout. For example, as a duty ratio of the first driving signal PDRV decreases, the charging time of the inductor L by the inductor current IL lengthens. Accordingly, energy stored in the inductor L increases and the output voltage Vout increases. On the other hand, as the duty ratio of the first driving signal PDRV increases (e.g., as a low level interval shortens), the charging time of the inductor L shortens. Accordingly, energy stored in the inductor L decreases and the output voltage Vout decreases.

The PMOS transistor PM and the NMOS transistor NM may be sequentially turned on in response to each of the first driving signal PDRV and the second driving signal NDRV. A ratio of the input voltage VDD and the output voltage Vout may be determined by a duty ratio of the first driving signal PDRV and the second driving signal NDRV.

The current meter 115b may measure output current of the switching regulator 110b and may provide the measured output current as the analog signal VCL. The current meter 115b may detect the current supplied through the PMOS transistor PM and the NMOS transistor NM, and provide the average value as the analog signal VCL indicating the load current. To obtain an average of the current to flow to the inductor L, the current meter 115b may use the first and second driving signals PDRV and NDRV. In other words, to obtain the time average of inductor current IL, the current meter 115b may use the switching time of the first and second driving signals PDRV and NDRV.

The current meter 115b may average the current IL to flow to the inductor L and measure the load current. Furthermore, to rapidly calculate the load current, the current meter 115b may obtain the load current using a peak value of the inductor current IL, and the first and second driving signals PDRV and NDRV. In other words, the current meter 115b may obtain the load current using the peak value of the inductor current IL generated by the PMOS transistor PM and the NMOS transistor NM and the switching time information. Moreover, the current meter 115b may provide the analog signal VCL using the calculated load current.

Figure 15:
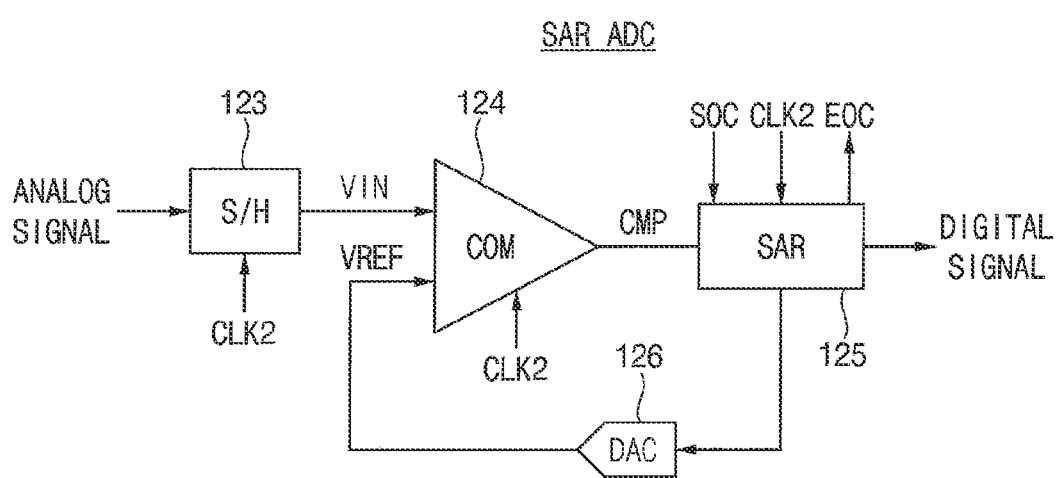
FIG. 15 is a diagram illustrating an analog-to-digital converter included in a PMIC according to an embodiment of the inventive concept.

FIG. 15 is a diagram illustrating an analog-to-digital converter included in a PMIC according to an embodiment of the inventive concept.

FIG. 15 illustrates a successive approximation register analog-to-digital converter SAR ADR as an example of the analog-to-digital converter ADC in FIG. 4.

Referring to FIG. 15, the SAR ADC includes a sample holding circuit S/H 123, a comparator COM 124, a SAR logic circuit 125, and a digital-to-analog converter DAC 126.

The sample holding circuit 123 samples and holds an analog signal in response to the second clock signal CLK2 to generate an input signal VIN. The comparator 124 generate a comparison signal CMP by comparing the input signal VIN and a reference voltage VREF during the activation period of the second clock signal CLK2. The comparator 124 may be reset to activate the comparison signal CMP to the logic high level during the deactivation period of the second clock signal CLK2. During the activation period of the second clock signal CLK2, the comparison signal CMP may have the logic high level (e.g., the value of "1") when the input signal VIN is greater than the reference voltage VREF. In contrast, the comparison signal CMP may have the logic low level (e.g., the value of "0") when the input signal VIN is less than or equal to the reference voltage VREF.

The SAR logic circuit 125 may include shift registers, a combination circuit, and a successive approximation register (SAR). The SAR logic circuit 125 initiates a conversion operation in response to a conversion start signal SOC, allows the most significant bit of the n-bit digital data to be set to logic "1" and the other bits to be set to logic "0" while being shifted according to the second clock signal CLK2, and provides them to the digital-to-analog converter 126. If the comparison signal CMP has the value of "0", the value of the most significant bit is converted from "1" to "0", and then, the bit value is set to "1". On the contrary, if the comparison signal CMP has the value of "1", the value of the most significant bit is maintained at "1," and then, the bit value is set to "1". This operation is continuously repeated so that the n-bit digital signal is output. Therefore, the SAR logic circuit 125 converts an output signal of the shift registers from a low state to a high state in response to the n-th clock cycle of the second clock signal CLK2. After conversion, the SAR logic circuit 125 outputs a conversion end signal EOC.

The digital-to-analog converter 126 may convert the n-bit digital data provided from the SAR logic circuit 125 into an analog voltage and provides the analog voltage to the comparator 124 as the reference voltage VREF.

Figure 16:
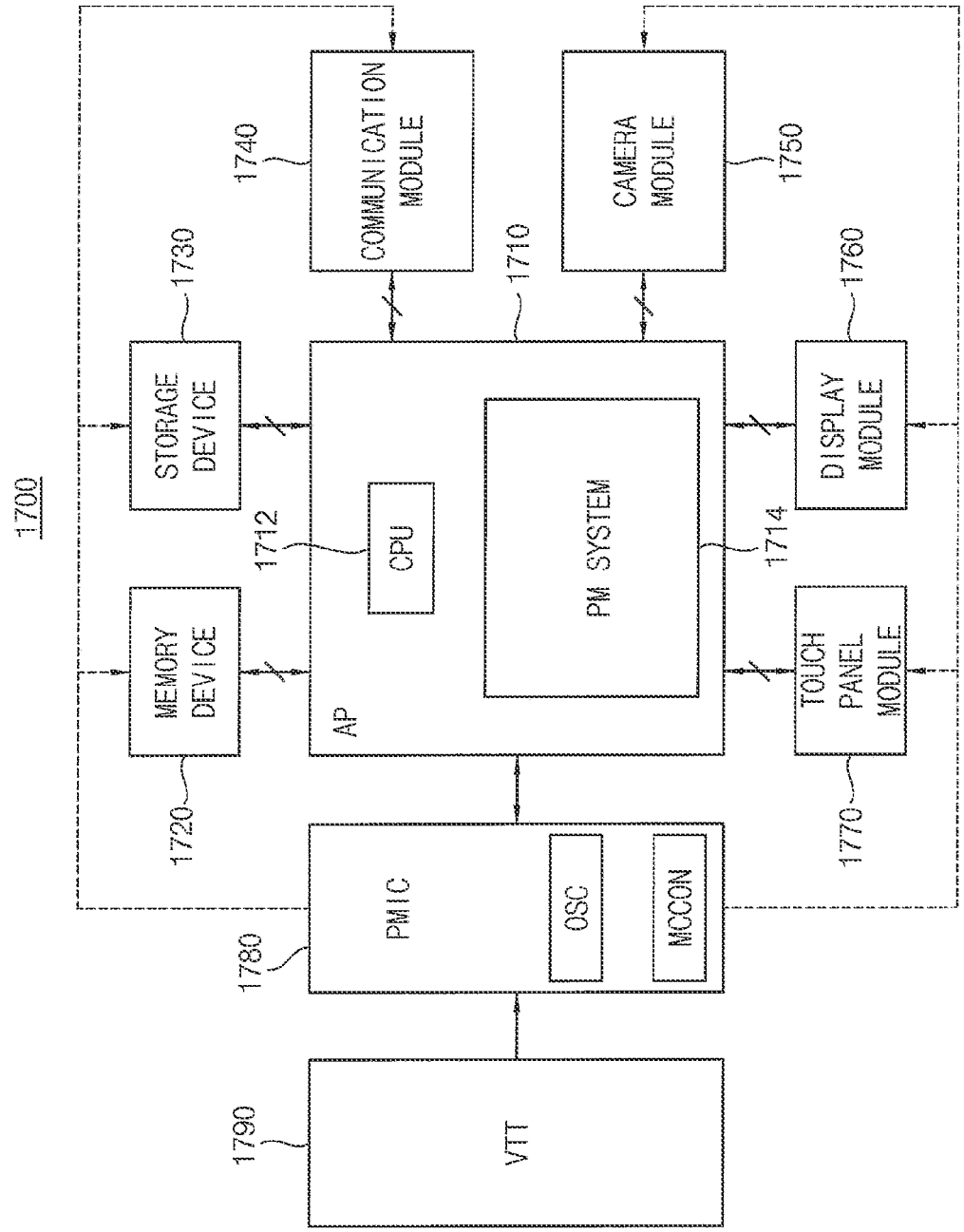
FIG. 16 is a block diagram illustrating a mobile device according to an embodiment of the inventive concept.

FIG. 16 is a block diagram illustrating a mobile device according to an embodiment of the inventive concept.

Referring to FIG. 16, a mobile device 1700 includes a system on chip 1710, a plurality of functional modules 1740, 1750, 1760, and 1770, a memory device 1720, a storage device 1730, a power management integrated circuit (PMIC) 1780, and a battery VTT 1790.

The system on chip 1710 controls overall operations of the mobile device 1700. The system on chip 1710 may control the memory device 1720, the storage device 1730, and the functional modules 1740, 1750, 1760, and 1770. For example, the system on chip 1710 may be an application processor (AP), and the system on chip 1710 may include a CPU core 1712 and a power management (PM) system 1714. The memory device 1720 and the storage device 1730 may store data for operations of the mobile device 1700. The memory device 1720 may correspond to a volatile semiconductor memory device such as a dynamic random access memory (DRAM) device, a static random access memory (SRAM) device, a mobile DRAM, etc. The storage device 1730 may correspond to a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In embodiments of the inventive concept, the storage device 730 corresponds to a solid state drive (SSD) device, a hard disk drive (HDD) device, a CD-ROM device, etc.

The functional modules 1740, 1750, 1760, and 1770 perform various functions of the mobile device 1700. For example, the mobile device 1700 may include a communication module 1740 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for microwave access (WiMAX) module, etc., a camera module 1750 that performs a camera function, a display module 1760 that performs a display function, a touch panel module 1770 that performs a touch sensing function, etc. In embodiments of the inventive concept, the mobile device 1700 further includes a global positioning system (GPS) module, a microphone (MIC) module, a speaker module, a gyroscope module, etc. However, the types or kinds of the functional modules 1740, 1750, 1760, and 1770 in the mobile device 1700 are not limited thereto.

According to embodiments of the inventive concept, the PMIC 1780 may include a measurement cycle controller MCCON and an oscillator OSC, as described above. The measurement cycle controller MCCON may operate based on a first clock signal having a first frequency and generate an oscillation enable signal that is activated during a measurement period. The oscillator OSC may generate a second clock signal having a second frequency higher than the first frequency based on the oscillation enable signal. A control logic of the PMIC 1780 may operate based on the second clock signal and generate the power information indicating the power consumed by the load currents during the measurement period. As described above, the PMIC 1780 may generate battery voltage information indicating a battery voltage and/or temperature information indicating operation temperatures in addition to the power information, and the real-time measurement information RMINF may include the battery voltage information and/or the temperature information in addition to the power information. The PM system 1714 in the system on chip 1710 may perform a dynamic voltage and frequency scaling (DVFS) operation and a thermal throttling operation based on the real-time measurement information RMINF.

As described above, the PMIC according to embodiments of the inventive concept may reduce power consumption for power measurement by activating the second clock signal only during the measurement period and deactivating the second clock signal during the idle period.

In addition, the PMIC according to embodiments of the inventive concept may reduce a measure time and efficiently perform additional measurements of temperature, a battery voltage, etc. in addition to the power measurement by determining the timing of the measurement period using the first clock signal having the first frequency, which is relatively low, and by performing the measurement operation using the second clock signal having the second frequency, which is relatively high.

The inventive concept may be applied to any electronic device or system requiring power management. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, an automotive driving system, etc.

While the inventive concept has been shown and described with reference to embodiments thereof, it will be apparent to those of ordinary skill in the art that various modifications in form and details may be made thereto without departing from the spirit and scope of the inventive concept as set forth by the appended claims.

What is claimed is:

1. A power management integrated circuit (PMIC) comprising:
a plurality of voltage regulators configured to generate a plurality of regulator voltages;
a conversion circuit configured to convert analog signals indicating load currents of the plurality of voltage regulators to generate digital signals corresponding to the load currents;
a measurement cycle controller circuit configured to operate in response to a first clock signal having a first frequency and generate an oscillation enable signal that is activated during a measurement period,
wherein a cycle period of the first clock signal is greater than a maximum time interval of the measurement period;
an oscillator configured to generate a second clock signal having a second frequency higher than the first frequency in response to the oscillation enable signal,
wherein the second clock signal is activated during the measurement period and is deactivated during an idle period other than the measurement period,
wherein the measurement period is a period in which at least one characteristic of the PMIC is measured, and the idle period is a period in which the at least one characteristic of the PMIC is not measured,
wherein the measurement period corresponds to an activation period of the oscillation enable signal, and the idle period corresponds to a deactivation period of the oscillation enable signal; and
a control logic circuit configured to operate in response to the second clock signal and generate power information, indicating power consumed by the load currents during the measurement period, using the digital signals.

2. The PMIC of claim 1, wherein the measurement cycle controller circuit is configured to enable the oscillator by activating the oscillation enable signal in response to an edge of the first clock signal.

3. The PMIC of claim 1, wherein the control logic circuit is configured to generate a measurement done signal that is activated when generation of the power information is completed, and the measurement cycle controller circuit is configured to disable the oscillator by deactivating the oscillation enable signal in response to activation of the measurement done signal.

4. The PMIC of claim 1, wherein the control logic circuit is configured to generate a measurement flag signal indicating whether to generate the power information in response to a power request signal provided from a load device.

5. The PMIC of claim 4, wherein the measurement cycle controller circuit is configured to determine whether to activate the oscillation enable signal at the edge of the first clock signal in response to the measurement flag signal.

6. The PMIC of claim 5, wherein the measurement cycle controller circuit is configured to maintain deactivation of the oscillation enable signal when the measurement flag signal is deactivated at the edge of the first clock signal, and configured to activate the oscillation enable signal when the measurement flag signal is activated at the edge of the first clock signal.

7. The PMIC of claim 1, wherein the conversion circuit is configured to convert an analog signal indicating a battery voltage of a battery disposed outside the PMIC to generate a digital signal corresponding to the battery voltage, and
the control logic circuit is configured to generate battery voltage information indicating the battery voltage using the digital signal corresponding to the battery voltage.

8. The PMIC of claim 1, wherein the conversion circuit is configured to convert analog signals, indicating operation temperatures and provided from temperature sensors disposed outside the PMIC, to generate digital signals corresponding to the operation temperatures, and
the control logic circuit is configured to generate temperature information indicating the operation temperatures using the digital signals corresponding to the operation temperatures.

9. The PMIC of claim 1, wherein the conversion circuit is configured to operate in response to the second clock signal.

10. The PMIC of claim 1, wherein the measurement cycle controller circuit is configured to generate a power-down signal that is activated during the idle period other than the measurement period.

11. The PMIC of claim 10, wherein the conversion circuit is configured to be enabled during a deactivation period of the power-down signal to generate the digital signals, and configured to be disabled during an activation period of the power-down signal.

12. The PMIC of claim 1, wherein the conversion circuit includes:
   a selector configured to select at least one of the analog signals in response to a selection signal provided from the control logic circuit and output an input analog signal corresponding to the at least one of the analog signals; and
   an analog-to-digital converter configured to convert the input analog signal to the digital signals.

13. The PMIC of claim 12, wherein the analog-to-digital converter is a successive approximation register (SAR) analog-to-digital converter.

14. The PMIC of claim 1, wherein each of the plurality of voltage regulators includes:
   a current meter configured to measure one of the load currents to generate a voltage signal corresponding to one of the load currents.

15. A power management integrated circuit (PMIC) comprising:
   a plurality of voltage regulators configured to generate a plurality of regulator voltages;
   a conversion circuit configured to convert analog signals, indicating load currents of the plurality of voltage regulators, a battery voltage, and operation temperatures, to generate digital signals corresponding to the load currents, the battery voltage, and the operation temperatures;
   a measurement cycle controller circuit configured to operate in response to a first clock signal having a first frequency and generate an oscillation enable signal that is activated during a measurement period,
   wherein a cycle period of the first clock signal is greater than a maximum time interval of the measurement period;
   an oscillator configured to be enabled in response to the oscillation enable signal to generate a second clock signal having a second frequency higher than the first frequency,
   wherein the second clock signal is activated during the measurement period and is deactivated during an idle period other than the measurement period,
   wherein the measurement period is a period in which at least one characteristic of the PMIC is measured, and the idle period is a period in which the at least one characteristic of the PMIC is not measured,
   wherein the measurement period corresponds to an activation period of the oscillation enable signal, and the idle period corresponds to a deactivation period of the oscillation enable signal; and
   a control logic circuit configured to operate in response to the second clock signal, and generate power information indicating power consumed by the load currents, battery information indicating the battery voltage, and temperature information indicating the operation temperatures during the measurement period, using the digital signals.

16. The PMIC of claim 15, wherein the control logic circuit is configured to:
   receive a power request signal indicating whether to provide the power information, a battery voltage request signal indicating whether to provide the battery voltage information, and a temperature request signal indicating whether to provide the temperature information; and
   determine a duration time interval of the measurement period based on the power request signal, the temperature request signal, and the battery voltage request signal.

17. The PMIC of claim 15, wherein the control logic circuit is configured to generate a measurement flag signal that is activated when at least one of the power request signal, the temperature request signal, and the battery voltage request signal is activated, and
   the measurement cycle controller circuit is configured to determine whether to activate the oscillation enable signal at an edge of the first clock signal in response to the measurement flag signal.

18. An electronic device comprising:
   a power management integrated circuit (PMIC) configured to generate, in response to a first clock signal having a first frequency, a second clock signal having a second frequency higher than the first frequency and activated during a measurement period, and configured to provide real-time measurement information in response to the second clock signal,
   wherein a cycle period of the first clock signal is greater than a maximum time interval of the measurement period,
   wherein the second clock signal is activated during the measurement period and is deactivated during an idle period other than the measurement period,
   wherein the measurement period is a period in which the real-time measurement information is measured, and the idle period is a period in which the real-time measurement information is not measured; and
   a load device configured to perform a dynamic voltage and frequency scaling (DVFS) operation and a thermal throttling operation in response to the real-time measurement information, wherein the load device is circuit comprising at least one processor.

* * * * *